(12) United States Patent
Jonkergouw et al.

(10) Patent No.: US 12,433,855 B2
(45) Date of Patent: Oct. 7, 2025

(54) METHOD OF INHIBITING GRAM-NEGATIVE BACTERIAL QUORUM SIGNALLING MOLECULES USING THE MACROCYCLE PILLAR[5]ARENE

(71) Applicant: AALTO UNIVERSITY FOUNDATION SR, Aalto (FI)

(72) Inventors: Christopher Jonkergouw, Aalto (FI); Kodiah Beyeh, Aalto (FI); Ekaterina Osmekhina, Aalto (FI); Robin Ras, Aalto (FI); Markus Linder, Aalto (FI)

(73) Assignee: AALTO UNIVERSITY FOUNDATION SR, Aalto (FI)

( * ) Notice: Subject to any disclaimer, the term of this patent is extended or adjusted under 35 U.S.C. 154(b) by 1045 days.

(21) Appl. No.: 17/283,471

(22) PCT Filed: Oct. 8, 2019

(86) PCT No.: PCT/FI2019/050717
§ 371 (c)(1),
(2) Date: Apr. 7, 2021

(87) PCT Pub. No.: WO2020/074776
PCT Pub. Date: Apr. 16, 2020

(65) Prior Publication Data
US 2022/0008364 A1 Jan. 13, 2022

(30) Foreign Application Priority Data
Oct. 8, 2018 (FI) .................................. 20185841

(51) Int. Cl.
| A61P 31/04 | (2006.01) |
| A61K 31/14 | (2006.01) |
| A61K 31/185 | (2006.01) |
| A61K 31/357 | (2006.01) |
| A61K 31/4188 | (2006.01) |
| A61K 31/724 | (2006.01) |

(52) U.S. Cl.
CPC ............ *A61K 31/14* (2013.01); *A61K 31/185* (2013.01); *A61K 31/357* (2013.01); *A61K 31/4188* (2013.01); *A61K 31/724* (2013.01); *A61P 31/04* (2018.01)

(58) Field of Classification Search
CPC ....................................................... A61P 31/04
See application file for complete search history.

(56) References Cited

U.S. PATENT DOCUMENTS

| 2010/0160423 A1 | 6/2010 | Bassler et al. |
| 2016/0361292 A1 | 12/2016 | Gokel et al. |

FOREIGN PATENT DOCUMENTS

| CN | 1681531 A | 10/2005 |
| CN | 106674114 A | 5/2017 |
| CN | 108017690 A | 5/2018 |
| JP | 4905724 B2 | 3/2012 |
| WO | 95/19974 A2 | 7/1995 |
| WO | 2017025951 A1 | 2/2017 |

OTHER PUBLICATIONS

Xue, M., et al., 2012, Pillararenes, a new class of macrocycles for supramolecular chemistry, Acct. Chem. Res. 45(8):1294-1308.*
Ogoshi, T., et al., 2016a, Pillar[n]arenes: synthesis, structure, and applications, In Encyclopedia of Polymer Science and Technology, John Wiley and Sons, pp. 1-36.*
Lewin, V., et al., Jun. 2013, Synthesis of cucurbit[6]uril derivatives and insights into their solubility in water, Eur. J. Org. Chem. 3857-3865.*
Ogoshi, T., et al., 2016b, Pillar-shaped macrocyclic hosts pillar[n]arenes: new key players for supramolecular chemistry, Chem. Rev. 116:7937-8002.*
Duan, Z., et al., 2022, Crown ether-based supramolecular polymers: from synthesis to self-assembly, Macromol. Rapid Commun. 43(2100775):1-35.*
Chwastek, M., et al., 2022, Anion-based self-assembly of resorcin[4]arenes and pyrogallol[4]arenes, J. Am. Chem. Soc. 144:5350-5358.*
International Search Report for International Application No. PCT/FI2019/050717 dated Mar. 26, 2020.
Eva Fenyvesi, "Potential of Cyclodextrins in Quorum Sensing", Cyclodextrin News, vol. 31, No. 1, Jan. 1, 2017, pp. 1-20.
Chigusa Okano et al., "[beta]-Cyclodextrin Interaction with N-Hexanoyl Homoserine Lactone as Quorum Sensing Signal Produced in Gram-Negative Bacteria", Transactions of the Materials Research Society of Japan, vol. 37, No. 2, Jan. 1, 2012, pp. 315-318.
Tomohiro Morohoshi et al, "Inhibition of quorum sensing in gram-negative bacteria by alkylamine-modified cyclodextrins", Journal of Bioscience and Bioengineering, vol. 116, No. 2, Aug. 1, 2013, pp. 175-179.
Nicolas Galanos et al., "Pentavalent pillar[5]arene-based glycoclusters and their multivalent binding to pathogenic bacterial lectins", Organic & Biomolecular Chemistry, vol. 14, No. 13, Jan. 1, 2016, pp. 3476-3481.
Roymon Joseph et al., "Cationic Pillararenes Potently Inhibit Biofilm Formation without Affecting Bacterial Growth and Viability", Journal of the American Chemical Society, vol. 138, No. 3, Jan. 14, 2016, pp. 754-757.
Arnab Dawn, "Multifaceted Supramolecular Interactions from C-Methylresorcin[4]arene Lead to an Enhancement in In Vitro Antibacterial Activity of Gatifloxacin—Dawn—2017—Chemistry—A European Journal—Wiley Online Library", Chemistry—A European Journal, vol. 23, No. 72, Dec. 22, 2017, pp. 18171-18179.
Lamartine Roger et al., "Antimicrobial activity of calixarenes", Comptes Rendus—Chimie, Elsevier, Paris, FR, vol. 5, No. 3, Jan. 1, 2002, pp. 163-169.
Search Report for Finnish Application No. 20185841 dated May 8, 2019.

(Continued)

*Primary Examiner* — Jeffrey S Parkin
(74) *Attorney, Agent, or Firm* — Meunier Carlin & Curfman LLC (57) ABSTRACT

This invention relates to macrocyclic cavity containing compounds and uses thereof in inhibiting a microbial signalling molecule or in reducing the amount of a microbial signalling molecule in a subject. The invention also relates to methods for inhibiting a microbial signalling molecule or for reducing the amount of a microbial signalling molecule in a subject by contacting a macrocyclic cavity-containing compound with said subject.

6 Claims, 10 Drawing Sheets

(56) References Cited

OTHER PUBLICATIONS

Kato, N. et al. Control of Gram-Negative Bacterial Quorum Sensing with Cyclodextrin Immobilized Cellulose Ether Gel. In: J. Incl. Phenom. Macrocycl. Chem 2006-10-31, vol. 56, No. 1-2, pp. 55-59.

Choi, J. et al. A rationally designed macrocyclic cavitand that kills bacteria with high efficacy and good selectivity. In: Chem. Comm. 2007, No. 11, pp. 1151-1153.

International Report on Patentability for International Application No. PCT/FI2019/050717 dated Feb. 3, 2021.

Office action from Finnish Patent and Registration Office in regards with corresponding application FI20185841, dated on Sep. 16, 2022; 7 pages.

Jonkergouw et al. "Repurposing host-guest chemistry to sequester virulence and eradicate biofilms in multidrug resistant Pseudomonas aeruginosa and Acinetobacter baumannii", Nature Communications, 14, 2141 (2023).

Luotonen et al. "Resolving host-guest interactions between pillararenes and homoserine lactones to restrain bacterial quorum sensing", Cell Reports Physical Science, 5, 102089 (2024).

Chemani et al. "Role of LecA and LecB Lectins in Pseudomonas aeruginosa-Induced Lung Injury and Effect of Carbohydrate Ligands", Infection and Immunity, 77, 5, 2065-2075 (2009).

\* cited by examiner

FIGURE 1

RhI (C4-HSL)
*Pseudomonas aeruginosa*

Lux (C6-HSL)
*Vibrio fischeri*

Rpa (pC-HSL)
*Rhodopseudomonas*

Las (3-oxo-C12-HSL)
*Pseudomonas aeruginosa*

Cin (C14-HSL)
*Rhizobium leguminosarum*

METHOD OF INHIBITING GRAM-NEGATIVE BACTERIAL QUORUM SIGNALLING MOLECULES USING THE MACROCYCLE PILLAR[5]ARENE

This application is a U.S. national application of international application number PCT/FI2019/050717 filed on Oct. 8, 2019 and claiming priority of FI20185841 filed on Oct. 8, 2018, the contents of both of which are incorporated herein by reference.

FIELD OF THE INVENTION

This invention relates to macrocyclic cavity-containing compounds and uses thereof in inhibiting a microbial signalling molecule or in reducing the amount of a microbial signalling molecule in a subject. The invention also relates to methods for inhibiting a microbial signalling molecule or for reducing the amount of a microbial signalling molecule in a subject by contacting a macrocyclic cavity-containing compound with said subject.

BACKGROUND OF THE INVENTION

Antibiotic resistance is a fast-growing problem, where the common prescription of antibiotics for a wide variety of illnesses, only amplifies the rate of resistance. Multidrug resistance is so important, that the World Health Organization (WHO) has issued a global priority pathogens list of antibiotic resistance (WHO, 2017).

Microbes monitor their population density and coordinate the activities of individual cells in population level by intercellular communication mechanism utilizing microbial signalling molecules. One of these cell-to-cell communication mechanisms is quorum sensing. Both Gram-negative and Gram-positive bacteria use quorum sensing. Of particular interest are Gram-negative bacteria that are pathogenic to humans and where quorum sensing often plays a central role in their virulence, such as *Vibrio cholera, Yersinia pestis, Acinetobacter baumannii* and *Pseudomonas aeruginosa*.

WO2017/025951 discloses cationic pillar[n]arenes, which are capable of inhibiting or preventing biofilm formation.

The publications and other materials used herein to illuminate the background of the invention, and in particular, cases to provide additional details respecting the practice, are incorporated by reference.

BRIEF DESCRIPTION OF THE INVENTION

The present invention relates to a macrocyclic cavity-containing compound for use in inhibiting a microbial signalling molecule in a subject. The present invention relates also to a macrocyclic, cavity-containing compound for use in reducing the amount of a microbial signalling molecule in a subject.

The present invention relates to use of a macrocyclic, cavity-containing compound in inhibiting a microbial signalling molecule in a subject. In addition, the invention relates to use of a macrocyclic cavity containing compound in reducing the amount of a microbial signalling molecule in a subject.

The present invention relates to a method for inhibiting a microbial signalling molecule in a subject, wherein the method comprises contacting a macrocyclic, cavity-containing compound with said subject. The invention relates also to a method for reducing the amount of a microbial signalling molecule in a subject, wherein the method comprises contacting a macrocyclic, cavity-containing compound with said subject.

The present invention relates to a macrocyclic cavity-containing compound for use in preventing or treating a microbial signalling molecule dependent and/or mediated infection in a subject.

The present invention also relates to a use of a macrocyclic cavity-containing compound in preventing or treating a microbial signalling molecule dependent and/or mediated infection in a subject.

The present invention relates to a method for preventing or treating a microbial signalling molecule dependent and/or mediated infection in a subject, wherein the method comprises contacting a macrocyclic cavity-containing compound with said subject.

The objects of the invention are achieved by compounds, uses and methods characterized by what is stated in the independent claims. The preferred embodiments of the invention are disclosed in the dependent claims.

DETAILED DESCRIPTION OF THE INVENTION

Unless otherwise specified, the terms used in the description and claims have the meanings known to a person skilled in the art.

In the present specification, the term "macrocyclic cavity-containing compound" refers to an organic cyclic compound forming cylindrical structure providing a cavity for host-guest interaction. Examples of such compounds are cyclodextrins, cucurbiturils, pillararenes, calixarenes and crown ethers.

Since many microbes, especially Gram-negative pathogens, only show virulence and express toxic effects when a quorum density of cells is reached, targeting the quorum signaling molecules forms an interesting strategy, termed "quorum quenching", to prevent pathogenicity. Quorum quenching includes all means designed to prevent the signaling molecules from binding to their intracellular receptors. Since quorum sensing is not essential for growth of the microbes and quorum quenching generally does not provide pressure for survival of the microbes, resistance development to the treatment is not seen.

The present invention is based on a finding that a macrocyclic cavity-containing compound can act as a host for a microbial signalling molecule, such as a quorum sensing signal molecule. Specifically, the present invention is based on a finding that macrocyclic cavity-containing compounds, such as a resorcin[4]arene, a pillar[5]arene, an alpha-cyclodextrin, a gamma-cyclodextrin, 18-crown-6, 15-crown-5, cucurbit[6]uril and 4-sulfocalix[4]arene, are able to bind non-covalently homoserine lactones, HSLs, which are microbial signalling molecules produced by Gram-negative bacteria. The binding of HSLs by these compounds was shown to be an effective quorum quenching technique, which can be used to abolish or reduce virulence in microbes that express HSLs.

In the present invention, the macrocyclic cavity-containing compound inhibits a microbial signalling molecule or reduces the amount of a microbial signalling molecule by binding the microbial signalling molecule by non-covalent host-guest bonding. In the present invention, the macrocyclic cavity-containing compound prevents or treats a microbial signalling molecule dependent and/or mediated microbial infection by binding the microbial signalling molecule by non-covalent host-guest bonding.

The binding of a macrocyclic cavity-containing compound to a microbial signalling molecule is selective. The macrocyclic cavity-containing compounds, such as a pillar[5]arene, a resorcin[4]arene, an alpha-cyclodextrin, a gamma-cyclodextrin, 18-crown-6, 15-crown-5, cucurbit[6]uril and 4-sulfocalix[4]arene were found to bind to N-acyl-homoserine lactones (AHLs). For example, a pillar[5]arene was found to selectively bind long-chained N-acyl-homoserine lactones (AHLs). This enables the macrocyclic cavity-containing compound to target precisely the microbe of interest producing such AHLs only. The binding of the macrocyclic cavity-containing compound to microbial signalling molecules is strong and the compounds can absorb microbial signalling molecule concentrations even much higher than normally produced by natural bacteria. Unlike antibiotic agents, which also have toxic effects on human and/or animal cells, the macrocyclic cavity-containing compounds as hosts have no damaging effects on human and/or animal cells. The macrocyclic cavity-containing compounds have no negative growth effects on microbes. Thus, the microbial cells are not under a pressure for survival and are less likely to gain and/or build up resistance. The host-guest binding of a macrocyclic cavity-containing compound and a microbial signalling molecule is solely an extracellular process. The macrocyclic cavity-containing compounds are too large to enter the microbial cells, which further reduces the chances of resistance development in microbes. The macrocyclic cavity-containing compound, such as a pillar[5]arene, has a very good stability and is easily dissolved, and even stable, in water. Thus, these compounds can be applied in a wide variety of environments.

The present invention relates to a macrocyclic cavity-containing compound for use in inhibiting a microbial signalling molecule in a subject. The present invention relates also to a macrocyclic cavity-containing compound for use in reducing the amount of a microbial signalling molecule in a subject.

In one embodiment, at least one macrocyclic cavity-containing compound is used. In one embodiment, a combination of at least two macrocyclic cavity-containing compounds is used. In one embodiment, at least one macrocyclic cavity-containing compound is used together with an antibiotic. In one embodiment, the macrocyclic cavity-containing compound is selected from cyclodextrins, cucurbit urils, pillar arenes, calix arenes, crown ethers and/or salts thereof. In one embodiment, the macrocyclic cavity-containing compound is selected from cyclodextrins or salts thereof. In one embodiment, the macrocyclic cavity-containing compound is selected from alpha-cyclodextrins, gamma-cyclodextrins or salts thereof. In one embodiment, the macrocyclic cavity-containing compound is alpha-cyclodextrin or a salt thereof. In one embodiment, the macrocyclic cavity-containing compound is gamma-cyclodextrin or a salt thereof. In one embodiment, the macrocyclic cavity-containing compound is selected from calixarenes or salts thereof. In one embodiment, the calixarene is 4-sulfocalix[4]arene. In one embodiment, the macrocyclic cavity-containing compound is selected from resorcin arenes and/or salts thereof. In one embodiment, the macrocyclic cavity-containing compound is resorcin[4]arene or a salt thereof. In one embodiment, the macrocyclic cavity-containing compound is selected from pillararenes and/or salts thereof. In one embodiment, the macrocyclic cavity-containing compound is selected from pillar[5]arenes or salts thereof. In one embodiment, the pillar[5]arene is 4,9,14,19,24,26,28,30,32,34-Deca[2-(trimethylaminio)ethoxy]hexacyclo[21.2.2.2$^{3,6}$.2$^{8,11}$.2$^{13,16}$. 2$^{18,21}$]pentatriaconta-1(25),3,5,8,10,13,15,18,20,23,26,28, 30,32,34-pentadecaene•10bromide. In one embodiment, the macrocyclic cavity-containing compound is selected from crown ethers. In one embodiment, the crown ether is 18-crown-6 (1,4,7,10,13,16-Hexaoxacyclooctadecane). In one embodiment, the crown ether is 15-crown-5 (1,4,7,10, 13-Pentaoxacyclopentadecane). In on embodiment, the macrocyclic cavity-containing compound is selected from cucurbit urils. In one embodiment, the cucurbit uril is cucurbit [6]uril.

In one embodiment, the microbial signalling molecule is produced by bacteria. In one embodiment, the microbial signalling molecule is produced by Gram-positive bacteria. In one embodiment, the microbial signalling molecule is produced by Gram-negative bacteria. In one embodiment, the microbial signalling molecule is produced by bacteria belonging to genera *Pseudomonas, Acenitobacter, Vibrio, Yersinia, Rhizobium, Klebsiella* or an other virulent genus of the family Enterobacteriaceae. In one embodiment, the microbial signalling molecule is produced by bacteria belonging to genera *Pseudomonas*. In one embodiment, the microbial signalling molecule is produced by bacteria belonging to genera *Acenitobacter*. In one embodiment, the microbial signalling molecule is produced by bacteria belonging to genera *Vibrio*. In one embodiment, the microbial signalling molecule is produced by bacteria belonging to genera *Yersinia*. In one embodiment, the microbial signalling molecule is produced by bacteria belonging to genera *Rhizobium*. In one embodiment, the microbial signalling molecule is produced by bacteria belonging to genera *Klebsiella*. In one embodiment, the microbial signalling molecule is produced by *Pseudomonas aeruginosa, Acenitobacter baumannii, Vibrio cholera, Vibrio fischeri, Yersinia pestis, Rhizobium leguminosarum* or *Klebsiella pneumonia*. In one embodiment, the microbial signalling molecule is produced by *Pseudomonas aeruginosa*. In one embodiment, the microbial signalling molecule is produced by *Acenitobacter baumannii*. In one embodiment, the microbial signalling molecule is produced by *Vibrio cholera*. In one embodiment, the microbial signalling molecule is produced by *Vibrio fischeri*. In one embodiment, the microbial signalling molecule is produced by *Yersinia pestis*. In one embodiment, the microbial signalling molecule is produced by *Rhizobium leguminosarum*. In one embodiment, the microbial signalling molecule is produced by *Klebsiella pneumonia*.

In one embodiment, the microbial signalling molecule is a microbial quorum sensing signal molecule. In one embodiment, the microbial signalling molecule or the microbial quorum sensing signal molecule is selected from homoserine lactones (HSLs) and/or N-acyl-homoserine lactones (AHLs). In one embodiment, the carbon chain of the homoserine lactone (HSL) or the N-acyl-homoserine lactone has a length of 4 to 18 carbon atoms. In one embodiment, the carbon chain of the homoserine lactone (HSL) or the N-acyl-homoserine lactone (AHL) has a length of 6 to 14 carbon atoms. In one embodiment, the carbon chain of the homoserine lactone (HSL) or the N-acyl-homoserine lactone (AHL) is linear. In one embodiment, the carbon chain of the homoserine lactone (HSL) or the N-acyl-homoserine lactone (AHL) is branched.

In one embodiment, the subject is a human. In one embodiment, the subject is an animal.

The present invention relates also to use of a macrocyclic, cavity-containing compound in inhibiting a microbial signalling molecule in a subject. In addition, the invention relates to use of a macrocyclic cavity-containing compound in reducing the amount of a microbial signalling molecule in a subject.

In one embodiment, at least one macrocyclic cavity-containing compound is used. In one embodiment, a combination of at least two macrocyclic cavity-containing compounds is used. In one embodiment, at least one macrocyclic cavity-containing compound is used together with an antibiotic. In one embodiment, the macrocyclic cavity-containing compound is selected from cyclodextrins, cucurbiturils, pillararenes, calixarenes, crown ethers and/or salts thereof. In one embodiment, the macrocyclic cavity-containing compound is selected from cyclodextrins or salts thereof. In one embodiment, the macrocyclic cavity-containing compound is selected from alpha-cyclodextrins, gamma-cyclodextrins or salts thereof. In one embodiment, the macrocyclic cavity-containing compound is alpha-cyclodextrin or a salt thereof. In one embodiment, the macrocyclic cavity-containing compound is gamma-cyclodextrin or a salt thereof. In one embodiment, the macrocyclic cavity-containing compound is selected from calixarenes or salts thereof. In one embodiment, the calixarene is 4-sulfocalix[4]arene. In one embodiment, the macrocyclic cavity-containing compound is selected from resorcin arenes and/or salts thereof.

In one embodiment, the macrocyclic, cavity-containing compound is resorcin[4]arene or a salt thereof. In one embodiment, the macrocyclic, cavity-containing compound is selected from pillararenes or salts thereof. In one embodiment, the macrocyclic, cavity containing compound is a pillar[5]arene or a salt thereof. In one embodiment, the pillar[5]arene is 4,9,14,19,24,26,28,30,32,34-Deca[2-(trimethylaminio)ethoxy]hexacyclo[21.2.2.2$^{3,6}$.2$^{8,11}$.2$^{13,16}$.2$^{18,21}$]pentatriaconta-1(25),3,5,8,10,13,15,18,20,23,26,28,30,32,34-pentadecaene•10bromide. In one embodiment, the macrocyclic cavity-containing compound is selected from crown ethers. In one embodiment, the crown ether is 18-crown-6 (1,4,7,10,13,16-Hexaoxacyclooctadecane). In one embodiment, the crown ether is 15-crown-5 (1,4,7,10,13-Pentaoxacyclopentadecane). In on embodiment, the macrocyclic cavity-containing compound is selected from cucurbit urils. In one embodiment, the cucurbit uril is cucurbit [6]uril.

In one embodiment, the microbial signalling molecule is produced by bacteria. In one embodiment, the microbial signalling molecule is produced by Gram-positive bacteria. In one embodiment, the microbial signalling molecule is produced by Gram-negative bacteria. In one embodiment, the microbial signalling molecule is produced by bacteria belonging to genera *Pseudomonas, Acenitobacter, Vibrio, Yersinia, Rhizobium, Klebsiella* or an other virulent genus of the family Enterobacteriaceae. In one embodiment, the microbial signalling molecule is produced by bacteria belonging to genera *Pseudomonas*. In one embodiment, the microbial signalling molecule is produced by bacteria belonging to genera *Acenitobacter*. In one embodiment, the microbial signalling molecule is produced by bacteria belonging to genera *Vibrio*. In one embodiment, the microbial signalling molecule is produced by bacteria belonging to genera *Yersinia*. In one embodiment, the microbial signalling molecule is produced by bacteria belonging to genera *Rhizobium*. In one embodiment, the microbial signalling molecule is produced by bacteria belonging to genera *Klebsiella*. In one embodiment, the microbial signalling molecule is produced by *Pseudomonas aeruginosa, Acenitobacter baumannii, Vibrio cholera, Vibrio fischeri, Yersinia pestis, Rhizobium leguminosarum* or *Klebsiella pneumonia*. In one embodiment, the microbial signalling molecule is produced by *Pseudomonas aeruginosa*. In one embodiment, the microbial signalling molecule is produced by *Acenitobacter baumannii*. In one embodiment, the microbial signalling molecule is produced by *Vibrio cholera*. In one embodiment, the microbial signalling molecule is produced by *Vibrio fischeri*. In one embodiment, the microbial signalling molecule is produced by *Yersinia pestis*. In one embodiment, the microbial signalling molecule is produced by *Rhizobium leguminosarum*. In one embodiment, the microbial signalling molecule is produced by *Klebsiella pneumonia*.

In one embodiment, the microbial signalling molecule is a microbial quorum sensing signal molecule. In one embodiment, the microbial signalling molecule or the quorum sensing signal molecule is selected from homoserine lactones (HSLs) and/or N-acyl-homoserine lactones (AHLs). In one embodiment, the carbon chain of the homoserine lactone (HSL) or the N-acyl-homoserine lactone (AHL) has a length of 4 to 18 carbon atoms. In one embodiment, the carbon chain of the homoserine lactone (HSL) or the N-acyl-homoserine lactone (AHL) has a length of 6 to 14 carbon atoms. In one embodiment, the carbon chain is linear. In one embodiment, the carbon chain is branched.

In one embodiment, the subject is a human or an animal. In one embodiment, the subject is a plant. In one embodiment, the subject is a cell culture. In one embodiment, the subject is a non-living object. The non-living object can be a medical device or an implant. In one embodiment, the non-living object is an aqueous medium.

The present invention relates to a method for inhibiting a microbial signalling molecule in a subject, wherein the method comprises contacting a macrocyclic, cavity-containing compound with said subject. The invention relates also to a method for reducing the amount of a microbial signalling molecule in a subject, wherein the method comprises contacting a macrocyclic, cavity-containing compound with said subject.

In one embodiment, at least one macrocyclic cavity-containing compound is used. In one embodiment, a combination of at least two macrocyclic cavity-containing compounds is used. In one embodiment, at least one macrocyclic cavity-containing compound is used together with an antibiotic. In one embodiment, the macrocyclic cavity-containing compound is selected from cyclodextrins, cucurbiturils, pillararenes, calixarenes, crown ethers and/or salts thereof. In one embodiment, the macrocyclic cavity-containing compound is selected from cyclodextrins or salts thereof. In one embodiment, the macrocyclic cavity-containing compound is selected from alpha-cyclodextrins, gamma-cyclodextrins or salts thereof. In one embodiment, the macrocyclic cavity-containing compound is alpha-cyclodextrin or a salt thereof. In one embodiment, the macrocyclic cavity-containing compound is gamma-cyclodextrin or a salt thereof. In one embodiment, the macrocyclic cavity-containing compound is selected from calixarenes or salts thereof. In one embodiment, the calixarene is 4-sulfocalix[4]arene. In one embodiment, the macrocyclic cavity-containing compound is selected from resorcin arenes and/or salts thereof. In one embodiment, the macrocyclic cavity-containing compound is resorcin[4]arene or a salt thereof. In one embodiment, the macrocyclic cavity-containing compound is selected from pillar arenes or salts thereof. In one embodiment, the macrocyclic cavity containing compound is a pillar[5]arene or a salt thereof. In one embodiment, the pillar[5]arene is 4,9,14,19,24,26,28,30,32,34-Deca[2-(trimethylaminio)ethoxy]hexacyclo[21.2.2.2$^{3,6}$.2$^{8,11}$.2$^{13,16}$.2$^{18,21}$]pentatriaconta-1(25),3,5,8,10,13,15,18,20,23,26,28,30,32,34-pentadecaene•10bromide. In one embodiment, the macrocyclic cavity-containing compound is selected from crown ethers. In one embodiment, the crown ether is 18-crown-6 (1,4,7,10,13,16-Hexaoxacyclooctadecane). In one embodiment, the crown ether is 15-crown-5 (1,4,7,10,13-Pentaoxacyclopentadecane). In on embodiment, the macrocyclic cavity-containing compound is selected from cucurbit urils. In one embodiment, the cucurbit uril is cucurbit[6]uril.

In one embodiment, the microbial signalling molecule is produced by bacteria. In one embodiment, the microbial signalling molecule is produced by Gram-positive bacteria. In one embodiment, the microbial signalling molecule is produced by Gram-negative bacteria. In one embodiment, the microbial signalling molecule is produced by bacteria belonging to genera *Pseudomonas, Acenitobacter, Vibrio, Yersinia, Rhizobium, Klebsiella* or an other virulent genus of the family Enterobacteriaceae. In one embodiment, the microbial signalling molecule is produced by bacteria belonging to genera *Pseudomonas*. In one embodiment, the microbial signalling molecule is produced by bacteria belonging to genera *Acenitobacter*. In one embodiment, the microbial signalling molecule is produced by bacteria belonging to genera *Vibrio*. In one embodiment, the microbial signalling molecule is produced by bacteria belonging to genera *Yersinia*. In one embodiment, the microbial signalling molecule is produced by bacteria belonging to genera *Rhizobium*. In one embodiment, the microbial signalling molecule is produced by bacteria belonging to genera *Klebsiella*. In one embodiment, the microbial signalling molecule is produced by *Pseudomonas aeruginosa, Acenitobacter baumannii, Vibrio cholera, Vibrio fischeri, Yersinia pestis, Rhizobium leguminosarum* or *Klebsiella pneumonia*. In one embodiment, the microbial signalling molecule is produced by *Pseudomonas aeruginosa*. In one embodiment, the microbial signalling molecule is produced by *Acenitobacter baumannii*. In one embodiment, the microbial signalling molecule is produced by *Vibrio cholera*. In one embodiment, the microbial signalling molecule is produced by *Vibrio fischeri*. In one embodiment, the microbial signalling molecule is produced by *Yersinia pestis*. In one embodiment, the microbial signalling molecule is produced by *Rhizobium leguminosarum*. In one embodiment, the microbial signalling molecule is produced by *Klebsiella pneumonia*.

In one embodiment, the microbial signalling molecule is an microbial quorum sensing signal molecule. In one embodiment, the microbial signalling molecule or the microbial quorum sensing signal molecule is selected from homoserine lactones (HSLs) and/or N-acyl-homoserine lactones (AHLs). In one embodiment, the carbon chain of the homoserine lactone (HSL) or the N-acyl-homoserine lactone (AHL) has a length of 4 to 18 carbon atoms. In one embodiment, the carbon chain of the homoserine lactone (HSL) or the N-acyl-homoserine lactone (AHL) has a length of 6 to 14 carbon atoms. In one embodiment, the carbon chain of the homoserine lactone (HSL) or the N-acyl-homoserine lactone (AHL) is linear. In one embodiment, the carbon chain of the homoserine lactone (HSL) or the N-acyl-homoserine lactone (AHL) is branched.

In one embodiment, the subject is a human or an animal. In one embodiment, the subject is a plant. In one embodiment, the subject is a cell culture. In one embodiment, the subject is a non-living object. The non-living object can be a medical device or an implant. In one embodiment, the non-living object is an aqueous medium.

In addition, the present invention relates to a macrocyclic cavity containing compound for use in preventing or treating a microbial signalling molecule dependent or mediated infection in a subject.

In one embodiment, at least one macrocyclic cavity-containing compound is used. In one embodiment, a combination of at least two macrocyclic cavity-containing compounds is used. In one embodiment, the at least one macrocyclic cavity-containing compound is used together with an antibiotic. In one embodiment, the macrocyclic cavity-containing compound is selected from cyclodextrins, cucurbiturils, pillararenes, calixarenes, crown ethers and/or salts thereof. In one embodiment, the macrocyclic cavity-containing compound is selected from cyclodextrins or salts thereof. In one embodiment, the macrocyclic cavity-containing compound is selected from alpha-cyclodextrins, gamma-cyclodextrins or salts thereof. In one embodiment, the macrocyclic cavity-containing compound is alpha-cyclodextrin or a salt thereof. In one embodiment, the macrocyclic cavity-containing compound is gamma-cyclodextrin or a salt thereof. In one embodiment, the macrocyclic cavity-containing compound is selected from calixarenes or salts thereof. In one embodiment, the calixarene is 4-sulfocalix[4]arene. In one embodiment, the macrocyclic cavity-containing compound is selected from resorcin arenes and/or salts thereof. In one embodiment, the macrocyclic cavity-containing compound is resorcin[4]arene or a salt thereof. In one embodiment, the macrocyclic, cavity-containing compound is selected from pillararenes or salts thereof. In one embodiment, the macrocyclic, cavity containing compound is a pillar[5]arene or a salt thereof. In one embodiment, the pillar[5]arene is 4,9,14,19,24,26,28,30,32,34-Deca[2-(trimethylaminio)ethoxy]hexacyclo[21.2.2.2$^{3,6}$.2$^{8,11}$.2$^{13,16}$.2$^{18,21}$]pentatriaconta-1(25),3,5,8,10,13,15,18,20,23,26,28,30,32,34-pentadecaene•10bromide. In one embodiment, the macrocyclic cavity-containing compound is selected from crown ethers. In one embodiment, the crown ether is 18-crown-6 (1,4,7,10,13,16-Hexaoxacyclooctadecane). In one embodiment, the crown ether is 15-crown-5 (1,4,7,10, 13-Pentaoxacyclopentadecane). In on embodiment, the macrocyclic cavity-containing compound is selected from cucurbit urils. In one embodiment, the cucurbit uril is cucurbit [6]uril.

In one embodiment, the microbial signalling molecule is produced by bacteria. In one embodiment, the microbial signalling molecule is produced by Gram-positive bacteria. In one embodiment, the microbial signalling molecule is produced by Gram-negative bacteria. In one embodiment, the microbial signalling molecule is produced by bacteria belonging to genera *Pseudomonas, Acenitobacter, Vibrio, Yersinia, Rhizobium, Klebsiella* or an other virulent genus of the family Enterobacteriaceae. In one embodiment, the microbial signalling molecule is produced by bacteria belonging to genera *Pseudomonas*. In one embodiment, the microbial signalling molecule is produced by bacteria belonging to genera *Acenitobacter*. In one embodiment, the microbial signalling molecule is produced by bacteria belonging to genera *Vibrio*. In one embodiment, the microbial signalling molecule is produced by bacteria belonging to genera *Yersinia*. In one embodiment, the microbial signalling molecule is produced by bacteria belonging to genera *Rhizobium*. In one embodiment, the microbial signalling molecule is produced by bacteria belonging to genera *Klebsiella*. In one embodiment, the microbial signalling molecule is produced by *Pseudomonas aeruginosa, Acenitobacter baumannii, Vibrio cholera, Vibrio fischeri, Yersinia pestis, Rhizobium leguminosarum* or *Klebsiella pneumonia*. In one embodiment, the microbial signalling molecule is produced by *Pseudomonas aeruginosa*. In one embodiment, the microbial signalling molecule is produced by *Acenitobacter baumannii*. In one embodiment, the microbial signalling molecule is produced by *Vibrio cholera*. In one embodiment, the microbial signalling molecule is produced by *Vibrio fischeri*. In one embodiment, the microbial signalling molecule is produced by *Yersinia pestis*. In one embodiment, the microbial signalling molecule is produced by *Rhizobium leguminosarum*. In one embodiment, the microbial signalling molecule is produced by *Klebsiella pneumonia*.

In one embodiment, the microbial signalling molecule is a microbial quorum sensing signal molecule. In one embodiment, the microbial signalling molecule or the microbial quorum sensing signal molecule is selected from homoserine lactones (HSLs) and/or N-acyl-homoserine lactones (AHLs). In one embodiment, the carbon chain of the homoserine lactone (HSL) or the N-acyl-homoserine lactone (AHL) has a length of 4 to 18 carbon atoms. In one embodiment, the carbon chain of the homoserine lactone (HSL) or the N-acyl-homoserine lactone (AHL) has a length of 6 to 14 carbon atoms. In one embodiment, the carbon chain of the homoserine lactone (HSL) or the N-acyl-homoserine lactone (AHL) is linear. In one embodiment, the carbon chain of the homoserine lactone (HSL) or the N-acyl-homoserine lactone (AHL) is branched.

In one embodiment, the microbial signalling molecule dependent or mediated infection is a chronic infection. In one embodiment, the infection is an acute infection or the infection is caused by planktonic microbes.

In one embodiment, the microbial signalling molecule dependent or mediated infection is a lung infection.

In one embodiment, the subject is a human. In one embodiment, the subject is an animal.

The present invention also relates to a use of a macrocyclic cavity-containing compound in preventing or treating a microbial signalling molecule dependent and/or mediated microbial infection in a subject.

In one embodiment, at least one macrocyclic cavity-containing compound is used. In one embodiment, a combination of at least two macrocyclic cavity-containing compounds is used. In one embodiment, at least one macrocyclic cavity-containing compound is used together with an antibiotic. In one embodiment, the macrocyclic cavity-containing compound is selected from cyclodextrins, cucurbiturils, pillararenes, calixarenes, crown ethers and/or salts thereof. In one embodiment, the macrocyclic cavity-containing compound is selected from cyclodextrins or salts thereof. In one embodiment, the macrocyclic cavity-containing compound is selected from alpha-cyclodextrins, gamma-cyclodextrins or salts thereof. In one embodiment, the macrocyclic, cavity-containing compound is alpha-cyclodextrin or a salt thereof. In one embodiment, the macrocyclic cavity-containing compound is gamma-cyclodextrin or a salt thereof. In one embodiment, the macrocyclic cavity-containing compound is selected from calixarenes or salts thereof. In one embodiment, the calixarene is 4-sulfocalix[4]arene. In one embodiment, the macrocyclic cavity-containing compound is selected from resorcin arenes and/or salts thereof. In one embodiment, the macrocyclic, cavity-containing compound is resorcin[4]arene or a salt thereof. In one embodiment, the macrocyclic, cavity-containing compound is selected from pillararenes or salts thereof. In one embodiment, the macrocyclic, cavity containing compound is a pillar[5]arene or a salt thereof. In one embodiment, the pillar[5]arene is 4,9,14,19,24,26,28,30,32,34-Deca[2-(trimethylaminio) ethoxy]hexacyclo[21.2.2.2$^{3,6}$.2$^{8,11}$.2$^{13,16}$.2$^{18,21}$]pentatriaconta-1(25),3,5,8,10,13,15,18,20,23,26,28,30,32,34-pentadecaene•10bromide. In one embodiment, the macrocyclic cavity-containing compound is selected from crown ethers. In one embodiment, the crown ether is 18-crown-6 (1,4,7,10,13,16-Hexaoxacyclooctadecane). In one embodiment, the crown ether is 15-crown-5 (1,4,7,10, 13-Pentaoxacyclopentadecane). In on embodiment, the macrocyclic cavity-containing compound is selected from cucurbit urils. In one embodiment, the cucurbit uril is cucurbit [6]uril.

In one embodiment, the microbial signalling molecule is produced by bacteria. In one embodiment, the microbial signalling molecule is produced by a Gram-positive bacteria. In one embodiment, the microbial signalling molecule is produced by a Gram-negative bacteria. In one embodiment, the microbial signalling molecule is produced by bacteria belonging to genera *Pseudomonas, Acenitobacter, Vibrio, Yersinia, Rhizobium, Klebsiella* or an other virulent genus of the family Enterobacteriaceae. In one embodiment, the microbial signalling molecule is produced by bacteria belonging to genera *Pseudomonas*. In one embodiment, the microbial signalling molecule is produced by bacteria belonging to genera *Acenitobacter*. In one embodiment, the microbial signalling molecule is produced by bacteria belonging to genera *Vibrio*. In one embodiment, the microbial signalling molecule is produced by bacteria belonging to genera *Yersinia*. In one embodiment, the microbial signalling molecule is produced by bacteria belonging to genera *Rhizobium*. In one embodiment, the microbial signalling molecule is produced by bacteria belonging to genera *Klebsiella*. In one embodiment, the microbial signalling molecule is produced by *Pseudomonas aeruginosa, Acenitobacter baumannii, Vibrio cholera, Vibrio fischeri, Yersinia pestis, Rhizobium leguminosarum* or *Klebsiella pneumonia*. In one embodiment, the microbial signalling molecule is produced by *Pseudomonas aeruginosa*. In one embodiment, the microbial signalling molecule is produced by *Acenitobacter baumannii*. In one embodiment, the microbial signalling molecule is produced by *Vibrio cholera*. In one embodiment, the microbial signalling molecule is produced by *Vibrio fischeri*. In one embodiment, the microbial signalling molecule is produced by *Yersinia pestis*. In one embodiment, the microbial signalling molecule is produced by *Rhizobium leguminosarum*. In one embodiment, the microbial signalling molecule is produced by *Klebsiella pneumonia*.

In one embodiment, the microbial signalling molecule is a microbial quorum sensing signal molecule. In one embodiment, the microbial signalling molecule or the microbial quorum sensing signal molecule is selected from homoserine lactones (HSLs) and/or N-acyl-homoserine lactones (AHLs). In one embodiment, the carbon chain of the homoserine lactone (HSL) or the N-acyl-homoserine lactone (AHL) has a length of 4 to 18 carbon atoms. In one embodiment, the carbon chain of the homoserine lactone (HSL) or the N-acyl-homoserine lactone (AHL) has a length of 6 to 14 carbon atoms. In one embodiment, the carbon chain of the homoserine lactone (HSL) or the N-acyl-homoserine lactone (AHL) is linear. In one embodiment, the carbon chain of the homoserine lactone (HSL) or the N-acyl-homoserine lactone (AHL) is branched.

In one embodiment, the microbial signalling molecule dependent or mediated infection is a chronic infection. In one embodiment, the infection is an acute infection or the infection is caused by planktonic microbes.

In one embodiment, the subject is a human or an animal. In one embodiment, the microbial signalling molecule dependent or mediated infection is a lung infection.

In one embodiment, the subject is a plant.

The present invention relates also to a method for preventing or treating a microbial signalling molecule dependent and/or mediated infection in a subject or a medium, wherein the method comprises contacting a macrocyclic, cavity-containing compound with said subject or said medium.

In one embodiment, the macrocyclic, cavity-containing compound is selected from cyclodextrins, cucurbiturils, pillararenes, calixarenes, crown ethers and/or salts thereof. In one embodiment, the macrocyclic, cavity-containing compound is selected from cyclodextrins or salts thereof. In one embodiment, the macrocyclic cavity-containing compound is selected from alpha-cyclodextrins, gamma-cyclodextrins or salts thereof. In one embodiment, the macrocyclic, cavity-containing compound is alpha-cyclodextrin or a salt thereof. In one embodiment, the macrocyclic cavity-containing compound is gamma-cyclodextrin or a salt thereof. In one embodiment, the macrocyclic, cavity-containing compound is selected from calixarenes or salts thereof. In one embodiment, the calixarene is 4-sulfocalix[4]arene. In one embodiment, the macrocyclic cavity-containing compound is selected from resorcin arenes and/or salts thereof. In one embodiment, the macrocyclic, cavity-containing compound is resorcin[4]arene or a salt thereof. In one embodiment, the macrocyclic, cavity-containing compound is selected from pillararenes or salts thereof. In one embodiment, the macrocyclic, cavity containing compound is a pillar[5]arene or a salt thereof. In one embodiment, the pillar[5]arene is 4,9,14,19,24,26,28,30,32,34-Deca[2-(trimethylaminio)ethoxy]hexacyclo[21.2.2.2$^{3,6}$.2$^{8,11}$.2$^{13,16}$.2$^{18,21}$]pentatriaconta-1(25),3,5,8,10,13,15,18,20,23,26,28,30,32,34-pentadecaene•10bromide. In one embodiment, the macrocyclic cavity-containing compound is selected from crown ethers. In one embodiment, the crown ether is 18-crown-6 (1,4,7,10,13,16-Hexaoxacyclooctadecane). In one embodiment, the crown ether is 15-crown-5 (1,4,7,10,13-Pentaoxacyclopentadecane). In on embodiment, the macrocyclic cavity-containing compound is selected from cucurbit urils. In one embodiment, the cucurbit uril is cucurbit [6]uril.

In one embodiment, the microbial signalling molecule is produced by bacteria. In one embodiment, the microbial signalling molecule is produced by Gram-positive bacteria. In one embodiment, the microbial signalling molecule is produced by Gram-negative bacteria. In one embodiment, the microbial signalling molecule is produced by bacteria belonging to genera *Pseudomonas, Acenitobacter, Vibrio, Yersinia, Rhizobium, Klebsiella* or an other virulent genus of the family Enterobacteriaceae. In one embodiment, the microbial signalling molecule is produced by bacteria belonging to genera *Pseudomonas*. In one embodiment, the microbial signalling molecule is produced by bacteria belonging to genera *Acenitobacter*. In one embodiment, the microbial signalling molecule is produced by bacteria belonging to genera *Vibrio*. In one embodiment, the microbial signalling molecule is produced by bacteria belonging to genera *Yersinia*. In one embodiment, the microbial signalling molecule is produced by bacteria belonging to genera *Rhizobium*. In one embodiment, the microbial signalling molecule is produced by bacteria belonging to genera *Klebsiella*. In one embodiment, the microbial signalling molecule is produced by *Pseudomonas aeruginosa, Acenitobacter baumannii, Vibrio cholera, Vibrio fischeri, Yersinia pestis, Rhizobium leguminosarum* or *Klebsiella pneumonia*. In one embodiment, the microbial signalling molecule is produced by *Pseudomonas aeruginosa*. In one embodiment, the microbial signalling molecule is produced by *Acenitobacter baumannii*. In one embodiment, the microbial signalling molecule is produced by *Vibrio cholera*. In one embodiment, the microbial signalling molecule is produced by *Vibrio fischeri*. In one embodiment, the microbial signalling molecule is produced by *Yersinia pestis*. In one embodiment, the microbial signalling molecule is produced by *Rhizobium leguminosarum*. In one embodiment, the microbial signalling molecule is produced by *Klebsiella pneumonia*. In one embodiment, the microbial signalling molecule is a microbial quorum sensing signal molecule. In one embodiment, the microbial signalling molecule or the microbial quorum sensing signal molecule is selected from homoserine lactones (HSLs) and/or N-acyl-homoserine lactones (AHLs). In one embodiment, the carbon chain of the homoserine lactone (HSL) or the N-acyl-homoserine lactone (AHL) has a length of 4 to 18 carbon atoms. In one embodiment, the carbon chain of the homoserine lactone (HSL) or the N-acyl-homoserine lactone (AHL) has a length of 6 to 14 carbon atoms. In one embodiment, the carbon chain of the homoserine lactone (HSL) or the N-acyl-homoserine lactone (AHL) is linear. In one embodiment, the carbon chain of the homoserine lactone (HSL) or the N-acyl-homoserine lactone (AHL) is branched.

In one embodiment, the microbial signalling molecule dependent or mediated infection is a chronic infection. In one embodiment, the infection is an acute infection or the infection is caused by planktonic microbes.

In one embodiment, the subject is a human or an animal. In one embodiment, the microbial signalling molecule dependent or mediated infection is a lung infection.

In one embodiment, the subject is a plant.

In a specific embodiment, the invention relates to a method for preventing or treating a microbial signalling molecule dependent and/or mediated infection in a human or an animal, wherein the method comprises administering at least one macrocyclic, cavity-containing compound to said human or said animal.

In one embodiment, the invention relates to a composition comprising a macrocyclic cavity-containing compound and a suitable carrier. In one embodiment, the invention relates to a composition comprising a macrocyclic cavity-containing compound and a suitable carrier for inhibiting a microbial signalling molecule or for reducing the amount of a microbial signalling molecule in a subject or a medium, or for preventing or treating a microbial signalling molecule dependent and/or mediated infection in a subject. The composition of the present invention can be prepared by techniques known in the art. The composition of the present invention can thus be in liquid or solid form, for example, and it can contain other additives and/or ingredients, such as fillers, diluents and/or adjuvants.

In one embodiment, the invention relates to a pharmaceutical composition comprising at least one macrocyclic cavity-containing compound and a pharmaceutically acceptable carrier. In one embodiment, the invention relates to a pharmaceutical composition comprising a macrocyclic cavity-containing compound and a pharmaceutically acceptable carrier for inhibiting a microbial signalling molecule or for reducing the amount of a microbial signalling molecule in a subject, or for preventing or treating a microbial signalling molecule mediated infection in a subject. The pharmaceutical composition of the present invention can be prepared by techniques known in the art. The pharmaceutical composition of the present invention can be administered orally, parenterally, topically or by inhalation, for example. The pharmaceutical composition can thus be in liquid, solid or powder form, for example. In one embodiment, the pharmaceutical composition is in the form of microparticles. In one embodiment, the microparticles are in the range of 1-5 μm. Depending on its route of administration, the composition contains necessary pharmaceutically acceptable additives and/or ingredients, such as fillers, diluents and/or adjuvants.

The following examples are given to further illustrate the invention without, however, restricting the invention thereto.

EXAMPLES

Example 1—Pyocyanin Assay

In testing the functionality of P[5]a as an actual quorum sensing inhibitor a pathogenic Gram-negative bacterium, *Pserudomonas aeruginosa*, which contains the LasI synthase that produces the 3-oxo-C12 HSL, was used.

*P. aeruginosa* utilizes multiple quorum sensing systems (Las, Rhl and Pqs). The Las system is at the top of a cascade that leads to the activation of the other quorum sensing systems, and is directly responsible for the production of the green toxin pyocyanin. Pyocyanin is a toxin produced by *Pseudomonas aeruginosa*, and the production is directly activated by the 3-oxo-C12 HSL. Pyocyanin is responsible for the death of cells in the lung during cystic fibrosis. Thus, the production of this toxin is related directly to the C12 Las AHL signal in a quorum-based response.

Bacterial cells were cultured for 24 hours in Luria Broth (LB) medium with 1 glucose added. Then, the culture fluid was separated from the cells and measured at OD695 (this measures the amount of green color).

Figure 12:
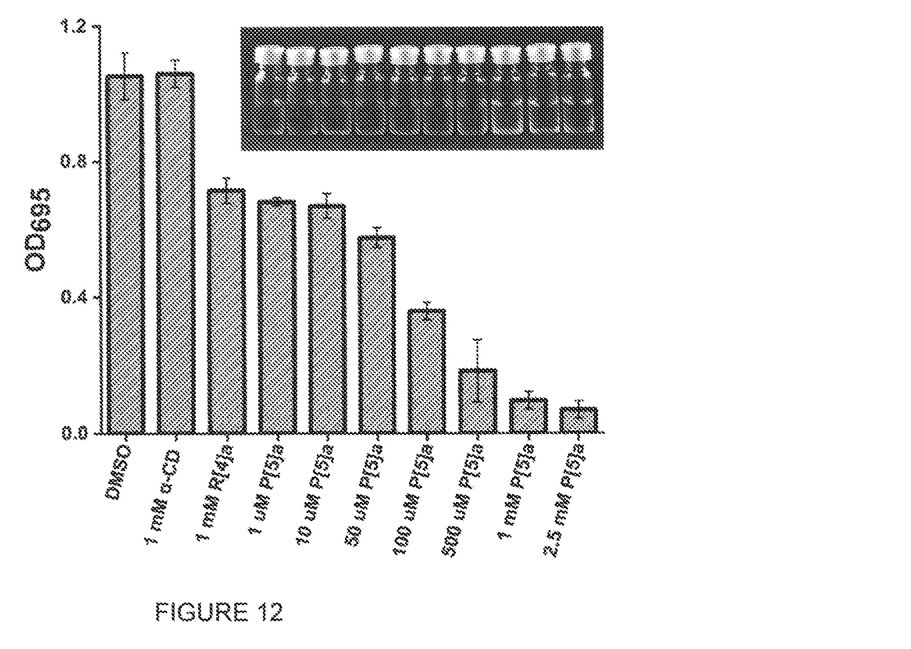
FIG. 12 shows the results of the pyocyanin assay of Example 1.
Figure 13:
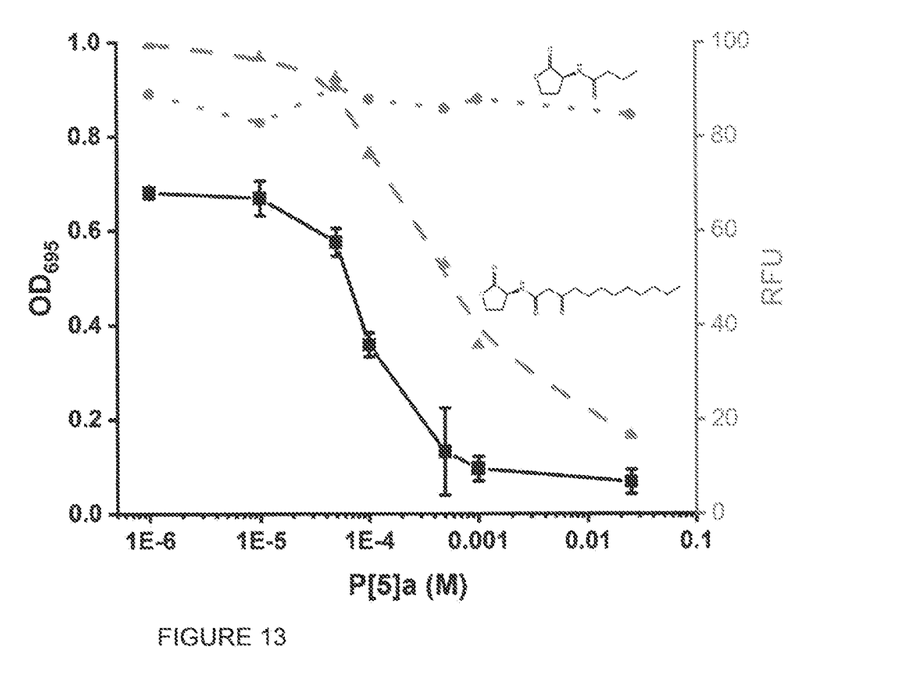
FIG. 13 shows the concentration dependency between the pyocyanin in *Pseudomonas aeruginosa* and the GFP fluorescence in *E. coli*.

In a pyocyanin assay, the effect of varying concentrations of a P[5]a (4,9,14,19,24,26,28,30,32,34-Deca[2-(trimethyl-aminio)ethoxy]hexacyclo[21.2.2.2$^{3,6}$.2$^{8,11}$.2$^{13,16}$.2$^{18,21}$]pentatriaconta-1(25),3,5,8,10,13,15,18,20,23,26,28,30,32,34-pentadecaene•10bromide, CAS No. 1351445-28-7) on the production of pyocyanin after 24 hours of growth was studied and the results are shown in FIG. 12. At no or low concentrations of the P[5]a, no significant differences could be detected in pyocyanin production, as indicated by the green color of the culture. However, in higher concentrations a shift to bright yellow (normal cellular cultures) is visible, indicating a complete inhibition of the P[5]a on the production of pyocyanin.

The host compound P[5]a was shown to completely inhibit toxin production, simply by the strong binding of the AHL. Cellular growth was not affected at all, only toxin production (virulence).

Example 2

To make sure that the P[5]a does not react directly with the pyocyanin metabolite, but rather inhibits its production by the cells, 24 hour cultures containing high levels of pyocyanin were taken and the cells were removed. New pyocyanin concentrations of the host were added and re-cultured for 24 hours. No decrease in pyocyanin levels were detected, indicating that the P[5]a inhibits the production of pyocyanin, rather than breakdown of the pyocyanin.

Example 3—P[5]a Microparticles

The pillar[5]arene (P[5]a) (4,9,14,19,24,26,28,30,32,34-Deca[2-(trimethylaminio)ethoxy]hexacyclo[21.2.2.2$^{3,6}$.2$^{8,11}$.2$^{13,16}$.2$^{18,21}$]pentatriaconta-1(25),3,5,8,10,13,15,18,20,23,26,28,30,32,34-pentadecaene•10bromide) was formulated as microparticles by an aerosol flow reactor method. The particle size was in the range of 1-5 μm, which enables the particles to reach the deep lung for high bioavailability of the active compound. The microparticles were made from precursor solutions of P[5]a, trehalose, sodium citrate and leucine for the protection of the labile peptides.

Figure 14:
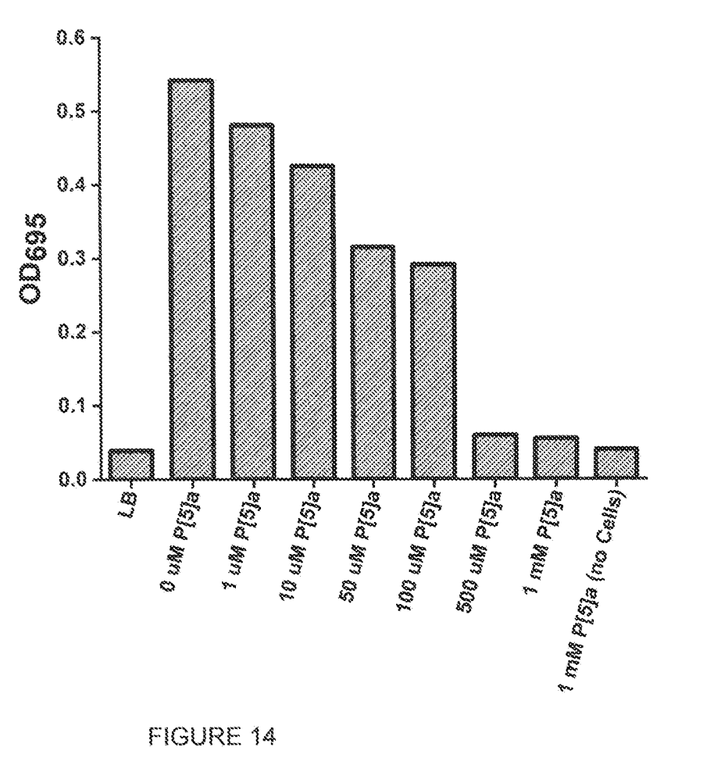
FIG. 14 shows the results of Example 3.
Figure 15:
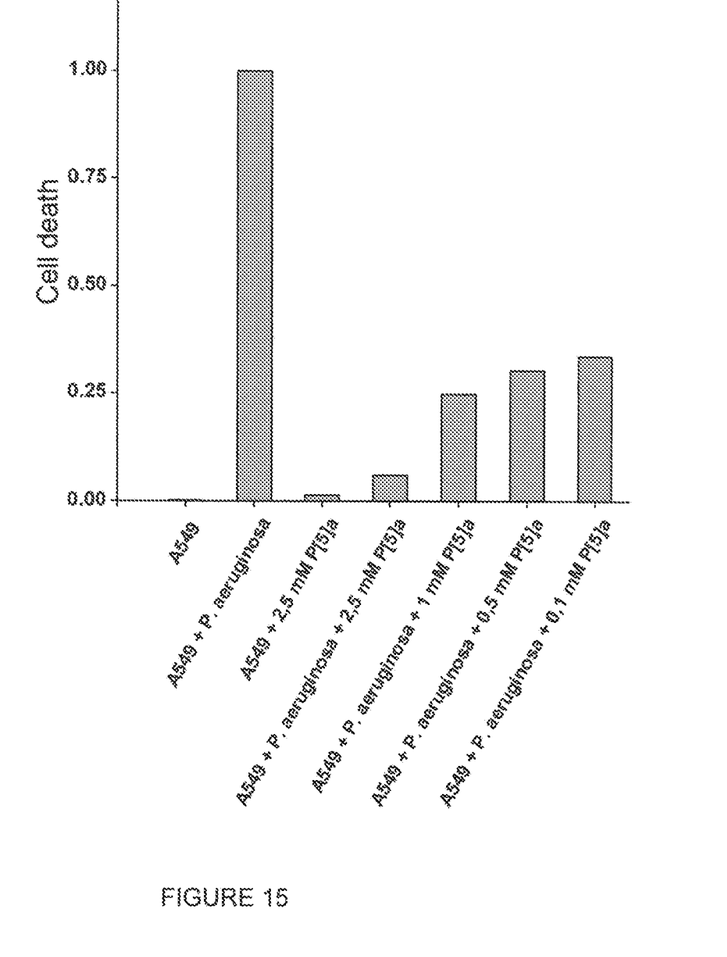
FIG. 15 shows the effect of pillar[5]arene on the cell death of *P. aeruginosa* in human lung cell (A549) culture.

The effect of the P[5]a microparticles in varying concentrations was measures as described in Example 1. The results are shown in FIG. 14. As can be seen from the results, the effect the P[5]a formulated as microparticles is in line with the results received in Example 1.

Example 4—Lung Cell Experiment

To assess the possible toxicity of P[5]a on the lung cells, two independent viability tests were performed. First, the viability of A549 cells grown in the presence of different concentrations of P[5]a was determined using trypan blue staining. The assay showed no significant difference between the viability of cells grown with or without the pillar[5]arene. Subsequently, the CellTox Green Cytotoxicity Assay (Promega) was carried out for A549 cells grown with and without P[5]a, in the presence or absence of PAO1 *P. aeruginosa* strain. The results showed that A549 cells infected with *P. aeruginosa* showed rapid (3 h incubation) increase in fluorescence that is an indicator of cell death. This was not observed for cells grown with the addition of P[5]a in the growth medium. Interestingly, the addition of the P[5]a to the growth medium during the infection with PAO1 strain led to reduction in cell death in a dose dependent manner.

In order to further study the influence of P[5]a on the eukaryotic cells, total RNA was isolated from A549 cells infected with *P. aeruginosa* in the presence or absence of 100 nM or 2.5 mM P[5]a. The expression of 46 genes were affected strongly enough to meet our stringent criteria and be considered as differentially expressed during the infection with PAO1. The analysis was carried out with GO Biological Process and it showed that many of the differentially expressed genes were involved in pro-inflammatory responses, responses to molecules of bacterial origin, chemotaxis, and regulation of cell proliferation. The chemokine ligands (CCL20, CXCL1, CXCL2, and CXCL3) together with intercellular adhesion molecule 1 (ICAM1) were the most up-regulated genes during the infection. Importantly, the addition of P[5]a to medium growth during infection reduced the overexpression of many of the differentially expressed genes. The expression of CXCL1, CXCL8, CCL20 and ICAM1 was significantly reduced when infection with PAO1 was carried out in the presence of P[5]a in a dose-dependent manner. Similar pattern was observed for the gene encoding for interferon regulatory factor 1 (IRF1), a transcriptional regulator that serves as an activator of genes involved in both innate and acquired immune responses. Conversely, the addition of P[5]a to the infected culture of A549 caused further overexpression of adrenomodullin (ADM) and colony stimulating factor 2 (CSF2), which are both implicated in response to bacterial infection.

Example 5

Figure 1:
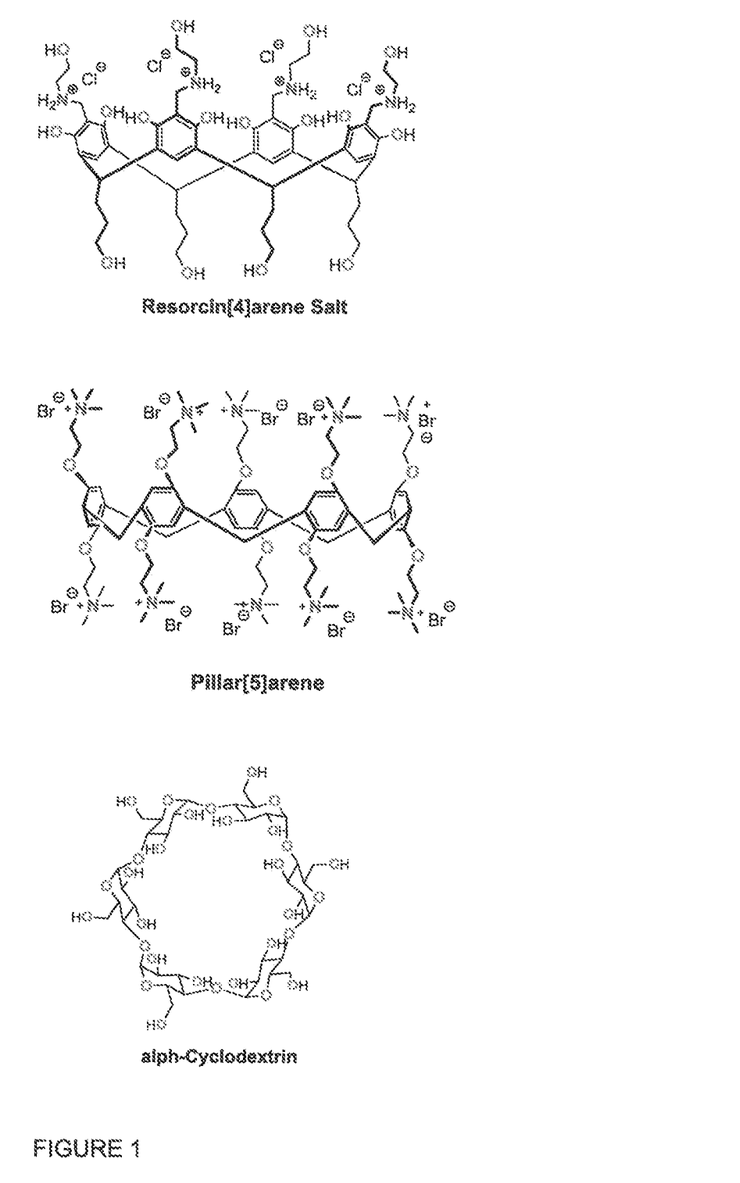
FIG. 1 shows the structures of resorcin[4]arene, pillar[5]arene and alpha-cyclodextrin.
Figure 2:
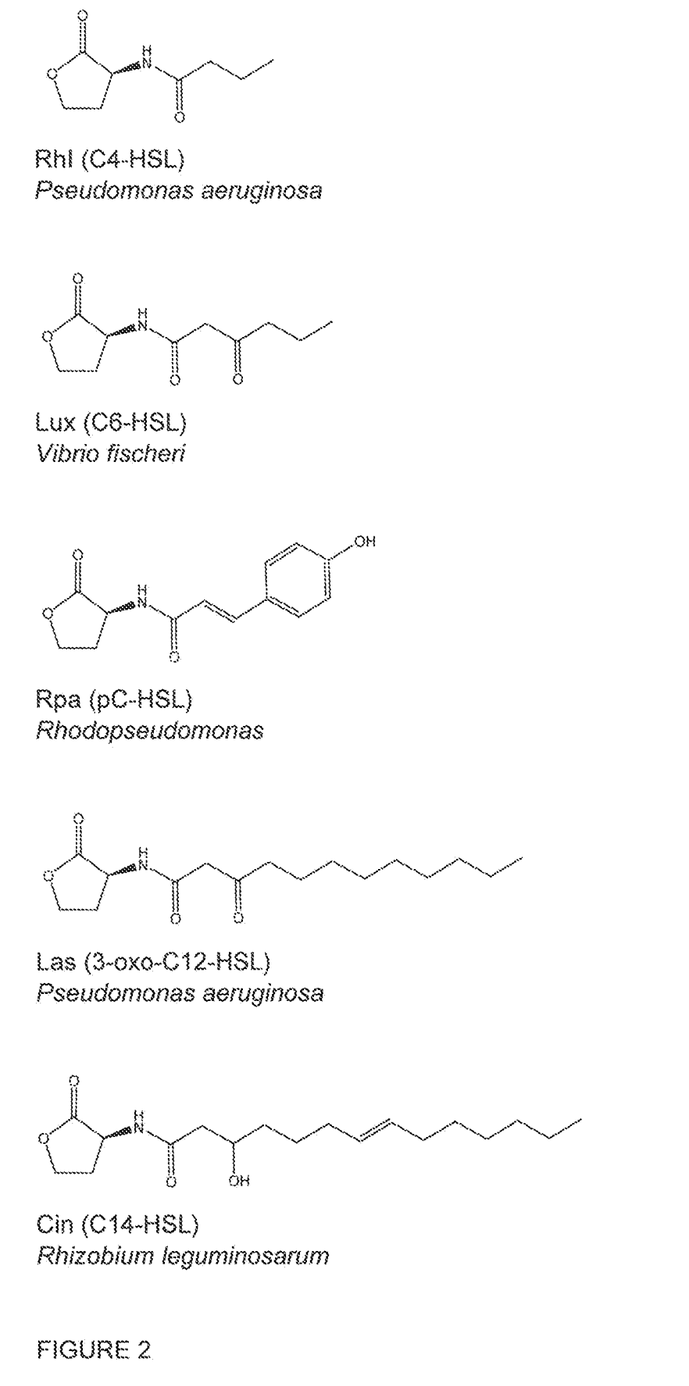
FIG. 2 shows the structures of homoserine lactones (HSLs) having carbon chains of different lengths.
Figure 3:
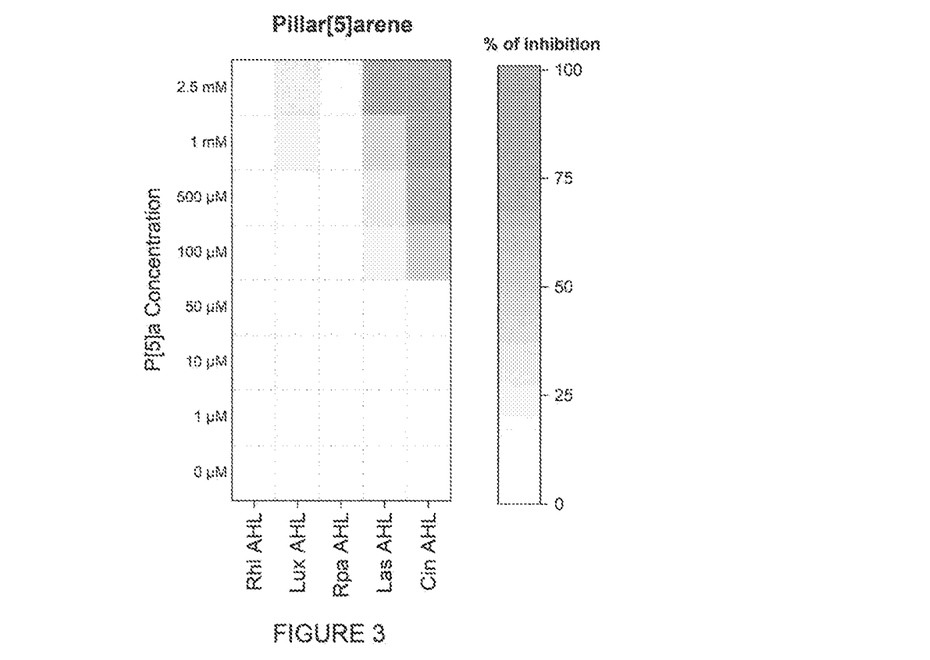
FIG. 3 shows the ability of a pillar[5]arene to bind HSLs having carbon chains of different lengths.
Figure 4:
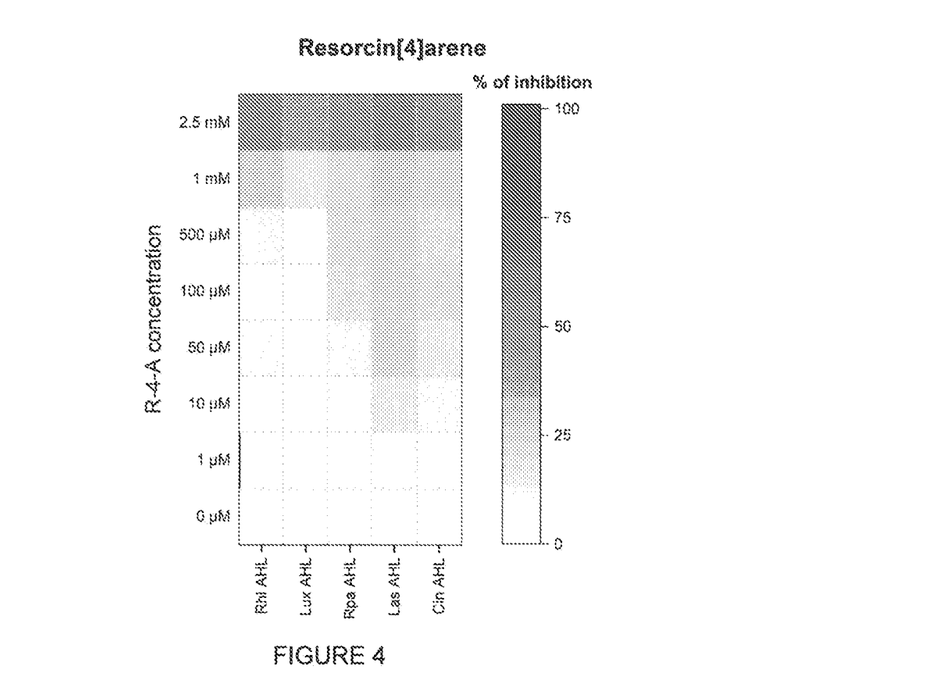
FIG. 4 shows the ability of a resorcin[4]arene to bind HSLs having carbon chains of different lengths.
Figure 5:
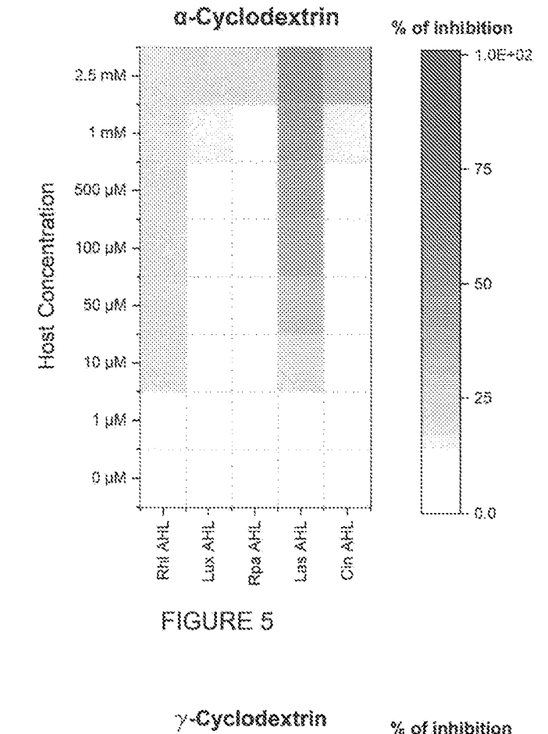
FIG. 5 shows the ability of an alpha-cyclodextrin to bind HSLs having carbon chains of different lengths.
Figure 6:
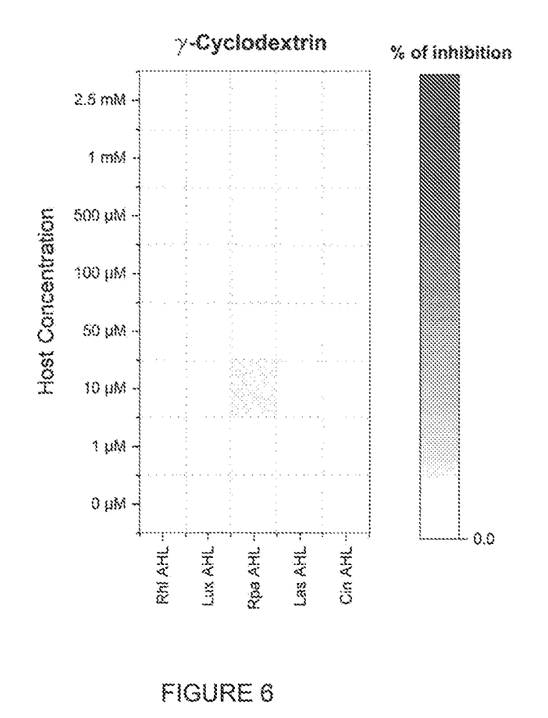
FIG. 6 shows the ability of a gamma-cyclodextrin to bind HSLs having carbon chains of different lengths.
Figure 7:
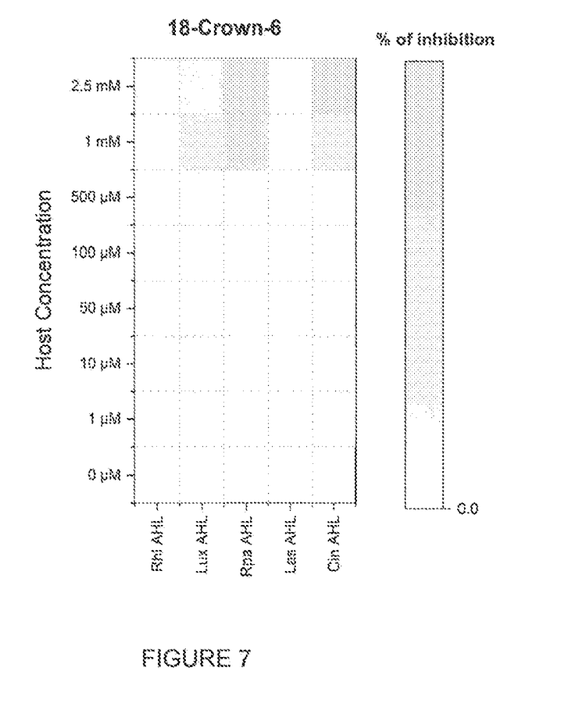
FIG. 7 shows the ability of 18-crown-6 to bind HSLs having carbon chains of different lengths.
Figure 8:
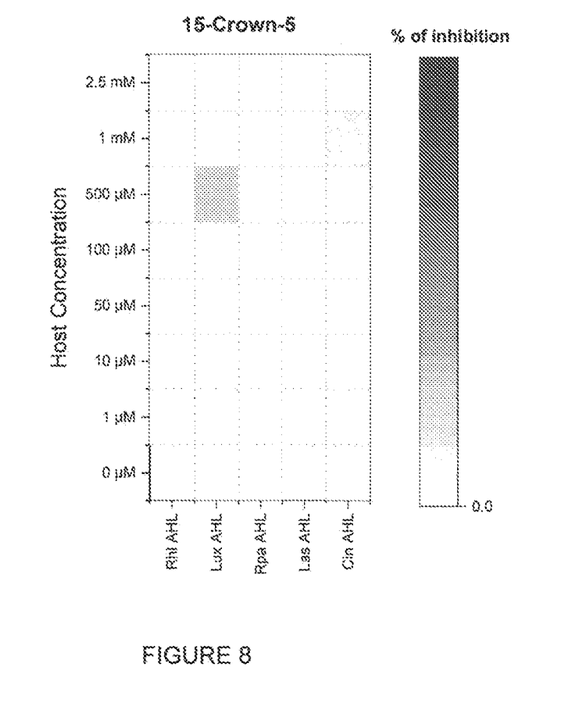
FIG. 8 shows the ability of 15-crown-5 to bind HSLs having carbon chains of different lengths.
Figure 9:
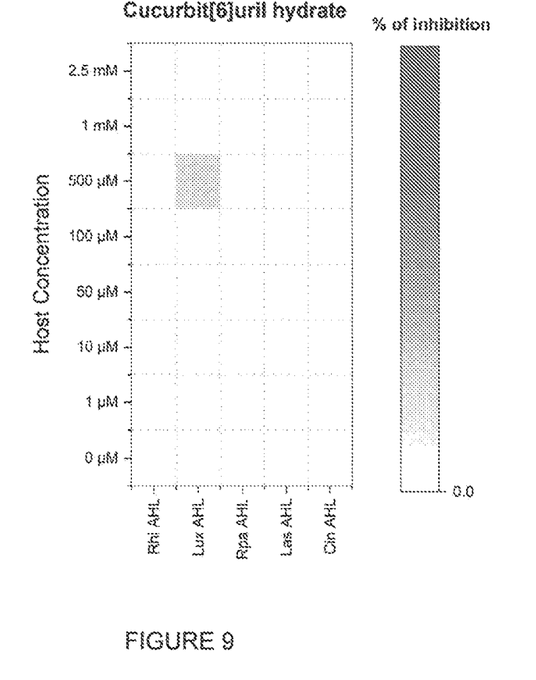
FIG. 9 shows the ability of cucurbit[6]uril hydrate to bind HSLs having carbon chains of different lengths.
Figure 10:
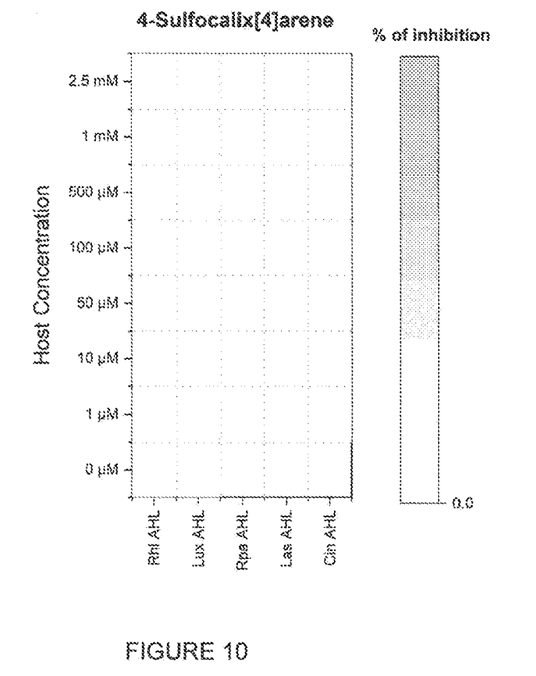
FIG. 10 shows the ability of 4-sulfocalix[4]arene to bind HSLs having carbon chains of different lengths.
Figure 11:
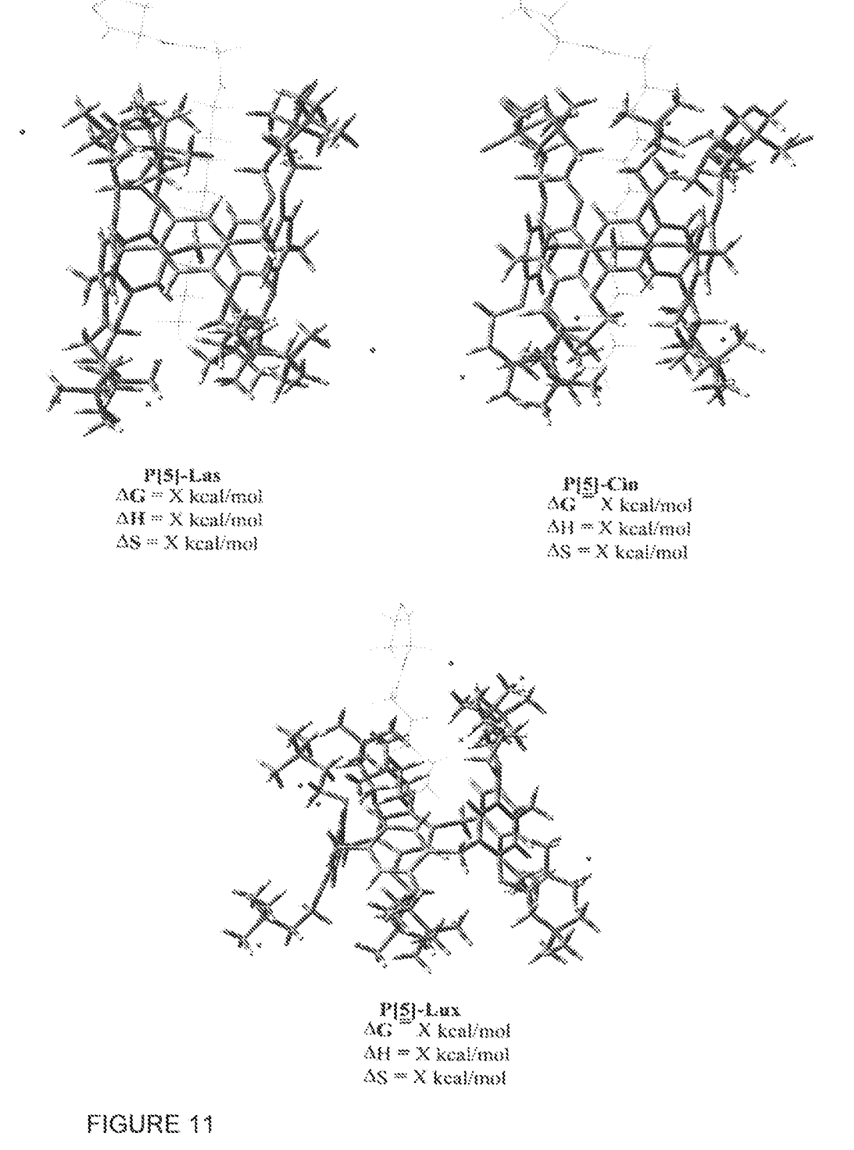
FIG. 11 shows the host-guest interaction of pillar[5]arene with HSLs having carbon chains of different lengths (C6, C12, C14).

The ability of a pillar[5]arene, a resorcin[4]arene, an alpha-cyclodextrin, a gamma-cyclodextrin, 18-crown-6, 15-crown-5, cucurbit[6]uril hydrate and 4-sulfocalix[4]arene to bind HSLs having carbon chains of different lengths (shown in FIG. 2) were tested. The results are shown in FIGS. 3-10.

The tested macrocyclic cavity-containing compounds were:

Pillar[5]arene; 4,9,14,19,24,26,28,30,32,34-Deca[2-(trimethylaminio)ethoxy]hexacyclo[21.2.2.2$^{3,6}$.2$^{8,11}$.2$^{13,16}$.2$^{18,21}$]pentatriaconta-1(25),3,5,8,10,13,15,18,20,23,26,28,30,32,34-pentadecaene•10bromide Resorcin[4]arene Alpha-cyclodextrin (molecular weight 973 g/mol), Gamma-cyclodextrin (molecular weight 1297 g/mol), 18-crown-6; 1,4,7,10,13,16-Hexaoxacyclooctadecane (molecular weight 264 g/mol), 15-crown-5; 1,4,7,10,13-Pentaoxacyclopentadecane (molecular weight 220 g/mol), Cucurbit[6]uril hydrate (molecular weight 996 g/mol), 4-sulfocalix[4]arene; 25,26,27,28-Tetrahydroxycalix[4]arene-5,11,17,23-tetrasulfonic acid; Calix[4]arene-4-sulfonic acid (molecular weight 744 g/mol).

It will be obvious to a person skilled in the art that, as the technology advances, the inventive concept can be implemented in various ways. The invention and its embodiments are not limited to the examples described above but may vary within the scope of the claims.

The invention claimed is:

1. A method to inhibit a microbial quorum signalling molecule or to reduce the amount of a microbial quorum signalling molecule produced by a Gram-negative bacteria in a subject, by binding the microbial quorum signaling molecule selected from homoserine lactones (HSLs) or N-acyl homoserine lactones (AHLs) by non-covalent host-guest bonding by a macrocyclic cavity-containing compound, wherein the method comprises contacting the macrocyclic, cavity-containing compound selected from pillar[5]arenes and/or salts thereof with said subject.

2. The method according to claim 1, wherein the Gram-negative bacteria comprises planktonic microbes.

3. A method to prevent or treat a microbial quorum signalling molecule dependent and/or mediated infection in a subject or a medium, which infection is caused by a Gram-negative bacteria by binding the microbial quorum signaling molecule selected from homoserine lactones (HSLs) or N-acyl homoserine lactones (AHLs) by non-covalent host-guest bonding by a macrocyclic cavity-containing compound, wherein the method comprises contacting the macrocyclic cavity-containing compound selected from pillar[5]arenes and/or salts thereof with said subject or medium.

4. The method according to claim 3, wherein the infection is an acute infection or the infection is caused by planktonic microbes.

5. A method to reduce or abolish virulence in a Gram-negative bacteria by non-covalent host-guest bonding between a macrocyclic cavity-containing compound and a microbial quorum signaling molecule selected from homoserine lactones (HSLs) or N-acyl homoserine lactones (AHLs) produced by a Gram-negative bacteria, wherein the macrocyclic cavity-containing compound is selected from pillar[5]arenes and/or salts thereof.

6. The method according to claim 5, wherein the Gram-negative bacteria comprises planktonic microbes.

* * * * *